United States Patent [19]
Reeser

[11] 3,834,516
[45] Sept. 10, 1974

[54] APPARATUS FOR ROTATING ARTICLES ON A MOVING CONVEYOR

[75] Inventor: Eugene F. Reeser, Hicksville, N.Y.

[73] Assignee: Phillips Petroleum Company, Bartlesville, Okla.

[22] Filed: Jan. 2, 1973

[21] Appl. No.: 320,499

[52] U.S. Cl. .............................................. 198/283
[51] Int. Cl. ........................................... B65g 47/24
[58] Field of Search...... 198/33 AB, 33 AC, 33 AD, 198/33 R, 30

[56] References Cited
UNITED STATES PATENTS
1,828,232  10/1931  Rowe.................................... 198/29
2,805,753  9/1957  Palmer................................... 198/33
2,973,608  3/1961  Killion............................. 198/33 AB
3,286,814  11/1966  Atkinson............................... 198/34

Primary Examiner—Richard E. Aegerter

[57] ABSTRACT

A star wheel and a cam element are mounted on opposite sides of a conveyor belt so that articles being transported by the belt engage the star wheel, causing the rotation of the star wheel and the article. The cam element forces the article to remain in engagement with the star wheel until the article has been rotated substantially 90°.

8 Claims, 2 Drawing Figures

PATENTED SEP 10 1974  3,834,516

APPARATUS FOR ROTATING ARTICLES ON A MOVING CONVEYOR

This invention relates to apparatus for rotating articles substantially 90° while the articles are being conveyed on a belt.

Equipment for automatically inserting a plurality of articles into a case frequently requires that the articles have a definite orientation upon being fed to the casing equipment. Occasionally, the processing equipment upstream of the automatic casing equipment provides the articles in an orientation other than that which is desired. For instance, some machines for packaging milk in gable-top milk cartons provide the filled cartons to the take-off conveyor with the ridge of the gable top being perpendicular to the direction of movement of the conveyor while with some automatic casing equipment it is desirable for the containers to be on the conveyor with the ridges thereof aligned parallel to the direction of movement of the conveyor.

Accordingly, it is an object of the invention to provide new apparatus for rotating articles while the articles are being conveyed on a belt, such new apparatus being simple in construction and operation. Another object of the invention is to provide a means for rotating articles on a conveyor belt which does not require synchronizing means. Another object of the invention is to provide apparatus for rotating articles on a conveyor which does not require a power input for the rotating elements thereof. Other objects, aspects and advantages of the invention will be apparent from a study of the specification, the drawings and the appended claims to the invention.

Figure 1:
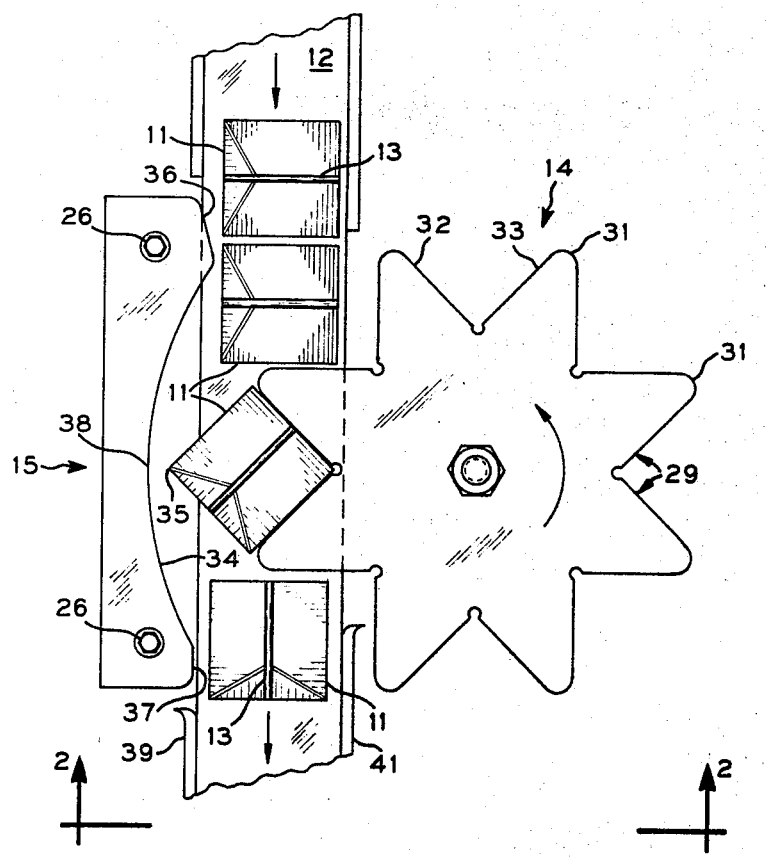
FIG. 1 is a plan view of a conveyor system embodying the present invention.
Figure 2:
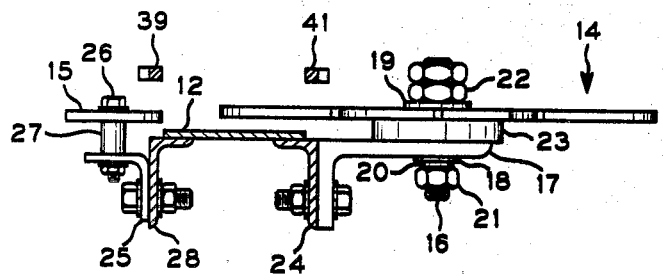
FIG. 2 is an end elevational view, partly in cross section, taken along line 2—2 of FIG. 1, omitting all of the cartons for the sake of simplicity.

Referring now to the drawings in detail, a series of gable-top milk cartons 11 are transported along a horizontal path by conveyor means including belt 12. The cartons 11 initially have their ridge panels 13 positioned perpendicular to the direction of travel of belt 12, and it is desirable that the cartons 11 have their ridge panels 13 parallel to the direction of travel of belt 12 for ease of handling the cartons in automatic casing machinery. This objective is accomplished in accordance with the present invention by the rotation of each of cartons 11 90° about its vertical axis through the utilization of star wheel 14 and stationary cam element or guide plate 15. Star wheel 14 is concentrically mounted about vertical shaft 16 for free rotation about the common vertical axis thereof. Shaft 16 is mounted on bracket 17 by means of machine washers 18 and 19, lock washer 20, and nuts 21 and 22. A spacer 23 can be employed to achieve the desired height of star wheel 14 above belt 12. Star wheel 14 will generally be in a position to contact the containers 11 at a level below the center of gravity of the containers. Bracket 17 is mounted on angle bar element 24, which is one of the supports for belt 12. Guide plate 15 is mounted on bracket 25 by means of a pair of bolts 26 and spacers 27. Bracket 25 is mounted on angle bar element 28, which is the other support for belt 12. Star wheel 14 is provided with a plurality of article engaging elements 29 extending horizontally outwardly along uniformly spaced lines radial to the common vertical axis of star wheel 14 and shaft 16. In the presently preferred embodiment for articles having a rectangular horizontal cross section, illustrated in the drawings, star wheel 14 has eight article engaging elements 29, each of which is substantially in the shape of an isosceles triangle with the outwardly projecting apex 31 being rounded, and the angle formed by the trailing edge 32 of one article engaging element and the leading edge 33 of the subsequent article engaging element 29 is substantially 90°. The shaft 16 is positioned adjacent one side of conveyor belt 12 so that star wheel 14 projects over at least a portion of belt 12 and into the path of containers 11.

Stationary cam element 15 is mounted adjacent the side of belt 12 opposite star wheel 14 and in a plane above belt 12 but below the center of gravity of containers 11. Cam element 15 has a first vertical cam surface 34 facing star wheel 14. At least a portion, and preferably all, of vertical cam surface 34 is at least substantially in the form of an arc of a horizontal circle having the center thereof in the vicinity of, and preferably at, the common vertical axis of shaft 16 and star wheel 14. The radius of this circle is slightly larger than the horizontal distance between the vertical axis of star wheel 14 and the furthest point 35 of container 11 when container 11 is engaged by adjacent elements 29.

In the embodiment illustrated in the drawings, cam element 15 is provided with a second vertical cam surface 36 upstream of first cam surface 34. Cam surface 36 is inclined inwardly at an acute angle to the direction of movement of belt 12 to cause containers contacting cam surface 36 to move toward star wheel 14. Cam element 15 can also be provided with a third vertical cam surface 37 which is substantially parallel to the direction of movement of belt 12 and is located downstream of first cam surface 34. The first cam surface 34 extends downstream for at least about 25°, and preferably at least about 30°, from a point 38 at or slightly upstream of a line perpendicular to the path of travel of belt 12 and extending through the vertical axis of shaft 16. In a presently preferred embodiment cam surface 34 extends upstream for at least about 15°, and more preferably about 30° from the point 38 on the line perpendicular to belt 12 and extending through the vertical axis of shaft 16. This portion of cam surface 34 upstream of point 38 aids in initially positioning the containers 11 in the pockets formed by adjacent elements 29, while the portion of cam surface 34 downstream of point 38 forces the containers 11 to remain in the pockets for the substantial completion of the 90° rotation of the containers. Thus, in general the cam surface 34 will extend at least about 25° and will preferably be in the range of about 40° to about 75°, more preferably in the range of about 50° to about 70°.

The horizontal movement of belt 12 causes each container 11 to enter the pocket formed by an adjacent pair of elements 29 of star wheel 14 and stationary cam element 15 and into contact with the trailing edge 32 of the leading element 29. The configuration of star wheel 14 is such that upon the star wheel 14 reaching the position at which a rotated container 11 disengages from star wheel 14, a pair of elements 29 are in a container receiving position. With respect to the rotating apparatus for rectangular articles, this means that one of the elements 29 extends over belt 12 with the trailing edge 32 thereof in position to be contacted by an article while the leading edge 33 of the subsequent element 29 is out of the path of the article. Due to the friction between container 11 and belt 12, the movement of belt 12 results in a container 11 exerting a force against the trailing edge 32 of the element 29 which the container 11 initially contacts, thereby causing a rotation of star wheel 14 at a rate corresponding to the movement of the container 11 along the direction of travel of belt 12. The force exerted by the containers 11 on star wheel 14 constitutes the sole motivating force for the rotation of star wheel 14. Any tendency of container 11 to move laterally on belt 12 away from star wheel 14 brings the container into contact with cam surface 34. Thus the container is constrained to remain within its pocket and be subjected to a rotation of substantially 90° about its vertical axis. As the container 11 reaches the point at which it has been rotated substantially 90°, it is no longer constrained by either star wheel 14 or cam element 15, and the continued motion of belt 12 carries the rotated container out of its pocket and away from star wheel 14. If desired, elongated guide rails 39 and 41 can be provided downstream of star wheel 14 on opposite sides of belt 12. The upstream end of each of guide rails 39 and 41 can be inclined upstream and outwardly with respect to the longitudinal center line of belt 12 to provide converging guide surfaces to receive the rotated containers 11 therebetween and to adjust the orientation of any container 11 which deviates from the desired orientation as a result of the container having been rotated slightly less or slightly more than 90° by star wheel 14 and cam element 15.

Star wheel 14 can have nominal resistance to rotation so that a single container 11 can effect a 90° rotation of star wheel 14, or it can have sufficient resistance to require two or more containers to effect the rotation thereof. In either case, the apparatus can be employed with a system in which the containers 11 are fed thereto at closely spaced or widely spaced intervals whether of uniform or nonuniform spacing. In the presently preferred embodiment, the edges 32 and 33 of elements 29 are substantially the same length as the corresponding dimensions of containers 11. Thus, if a series of containers with adjacent ones in contact with each other arrives, or if a subsequent container contacts the container in the receiving pocket position, the ensuing rotation of star wheel 14 contacts the leading container, permitting the apex of the trailing element 29 to separate the leading container from the subsequent container. Cam surface 36 can be employed to further this separating action by being extended into the path of the containers so that each container initially contacts cam surface 36 and is thereby caused to rotate slightly before contacting the leading element 29.

While the invention has been illustrated with articles having a square horizontal cross section, articles having other horizontal cross sections can be processed, including articles having other rectangular forms, as well as articles having oval, circular, triangular or other polygonal horizontal cross sections, it being sufficient that means is provided to prevent the rotation of the article within the pocket of the star wheel, either as a result of the shape of the article and the elements 29 or the friction between the article and elements 29.

Belt 12 can be any type of conveying surface which does not prevent the rotation of the articles thereon. Thus belt 12 can have a smooth surface or be provided with spaced transverse ridges which propel the articles but do not prevent the rotation thereof. It is recognized that, in general, it will be desired to employ belt 12 in the form of an endless belt, and in this connection the description of the direction of movement and the position of the belt with respect to star wheel 14 and cam element 15 is with respect to the portion of belt 12 carrying articles between star wheel 14 and cam element 15.

While cam surface 34 has been described as being in the form of an arc of a circle, it is obvious that the cam surface 34 does not have to be a perfect arc. In particular, it may be desirable for the portion upstream of point 38 to have a decreasing distance from shaft 16 moving from the cam surface 36 to point 38 to facilitate the entry of containers 11 into the pocket between the star wheel 14 and cam element 15 and then to aid in positioning the container between the arms 29 of star wheel 14.

Reasonable variations and modifications are possible within the scope of the foregoing disclosure, the drawings and the appended claims to the invention.

That which is claimed is:

1. Apparatus for rotating an object approximately 90° about its vertical axis, which comprises a conveyor means having a belt for moving said object along a horizontal path; a star wheel concentrically mounted on a vertical shaft for rotation about the common vertical axis thereof; means supporting said shaft permitting the free rotation of said star wheel about said common vertical axis; said star wheel having a plurality of article engaging elements extending horizontally outwardly along uniformly spaced lines radial to said common vertical axis; said shaft being positioned adjacent a first side of said belt so that said star wheel projects over at least a portion of said belt in said horizontal path; a stationary cam element; means for mounting said stationary cam element adjacent to the side of said belt opposite said first side; said stationary cam element having a first vertical cam surface facing said star wheel, at least a portion of said vertical cam surface being at least substantially in the form of an arc of a horizontal circle having the center thereof in the vicinity of said common axis, the radius of said circle being slightly larger than the horizontal distance between said common axis and the furthest point of said object when said object is engaged by adjacent ones of said article engaging elements, the movement of said belt causing said article to enter the pocket formed by an adjacent pair of article engaging elements of said star wheel and said stationary cam element and into contact with the trailing edge of the leading one of said pair of article engaging elements, the motivating force for the rotation of said star wheel being supplied by the mvement of said article resulting from the motion of said belt, the stationary cam element being positioned so that the arc shaped portion of said vertical cam surface forces the rotating article to remain in said pocket until said article has been rotated approximately 90°, the continued motion of said belt then carrying the thus rotated article away from said star wheel, said stationary cam element having a second vertical cam surface upstream of said first vertical cam surface, said second vertical cam surface being inclined at an angle to the direction of movement of said belt to cause articles contacting said second vertical cam surface to move toward said star wheel.

2. Apparatus in accordance with claim 1 wherein said star wheel has eight article engaging elements, each of which is substantially in the shape of an isosceles triangle with the outwardly projecting apex being rounded.

3. Apparatus in accordance with claim 1 wherein the center of said horizontal circle is said common vertical axis.

4. Apparatus in accordance with claim 1 wherein said article has a rectangular horizontal cross section, and wherein the angle formed by the trailing edge of one article engaging element and the leading edge of the subsequent article engaging element is substantially 90°.

5. Apparatus in accordance with claim 1 further comprising first and second elongated guide members positioned above and on opposite sides of said belt at a location downstream of said star wheel and extending substantially parallel to the direction of movement of said belt, the upstream end of each of said first and second elongated guide members being inclined outwardly with respect to the longitudinal center line of said belt to receive the thus-rotated article therebetween and to adjust the orientation of any article which deviates from the desired orientation.

6. Apparatus in accordance with claim 1 wherein said first vertical cam surface is in the form of an arc of at least 50° of said horizontal circle.

7. Apparatus in accordance with claim 1 wherein said star wheel has eight article engaging elements, each of which is substantially in the shape of an isosceles triangle with the outwardly projecting apex being rounded; and wherein the center of said horizontal circle is said common vertical axis.

8. Apparatus in accordance with claim 7 wherein said article has a rectangular horizontal cross section, and wherein the angle formed by the trailing edge of one article engaging element and the leading edge of the subsequent article engaging element is substantially 90°.

* * * * *